United States Patent [19]

Dolle

[11] 3,869,949
[45] Mar. 11, 1975

[54] SHEAR APPARATUS WITH IMPROVED BLADE HOLDING MEANS

[75] Inventor: David E. Dolle, Youngstown, Ohio

[73] Assignee: Aetna-Standard Engineering Company, Ellwood City, Pa.

[22] Filed: Feb. 27, 1974

[21] Appl. No.: 446,166

[52] U.S. Cl. .................. 83/320, 83/328, 83/700
[51] Int. Cl. .................. B23d 25/04, B26d 1/56
[58] Field of Search ........... 83/318, 320, 328, 698, 83/699, 700

[56] References Cited
UNITED STATES PATENTS

| | | | |
|---|---|---|---|
| 2,832,411 | 4/1958 | Richards et al. | 83/699 X |
| 3,251,256 | 5/1966 | McGrath | 83/700 X |
| 3,358,542 | 12/1967 | Murray | 83/698 X |
| 3,570,348 | 3/1971 | Hallden | 83/698 X |
| 3,641,856 | 2/1971 | Levy | 83/320 X |

Primary Examiner—Willie G. Abercrombie
Attorney, Agent, or Firm—Bosworth, Sessions & McCoy

[57] ABSTRACT

A flying shear is disclosed having upper and lower blade assemblies wherein upper and lower blade holders can be slid endwise out of the machine when replacing cutting blades and are rigidly clamped in position by adjustable tapered wedges acting against shoulders on the blade holder. The lower blade holder is mounted on a trapezoidal mounting member which has a small taper on both sides and is clamped between two oppositely tapered wedges in such a way that the gap between the cutting blades can be adjusted very easily while maintaining substantially perfect alignment of the blades by sliding the wedges lengthwise. Adjusting screws are provided to simplify this adjustment. Dovetail joints are provided between the side edges of the upper blade holder and its cooperating wedge and upper mounting member to prevent the upper blade holder from dropping out of its mounting member.

14 Claims, 9 Drawing Figures

FIG. 1

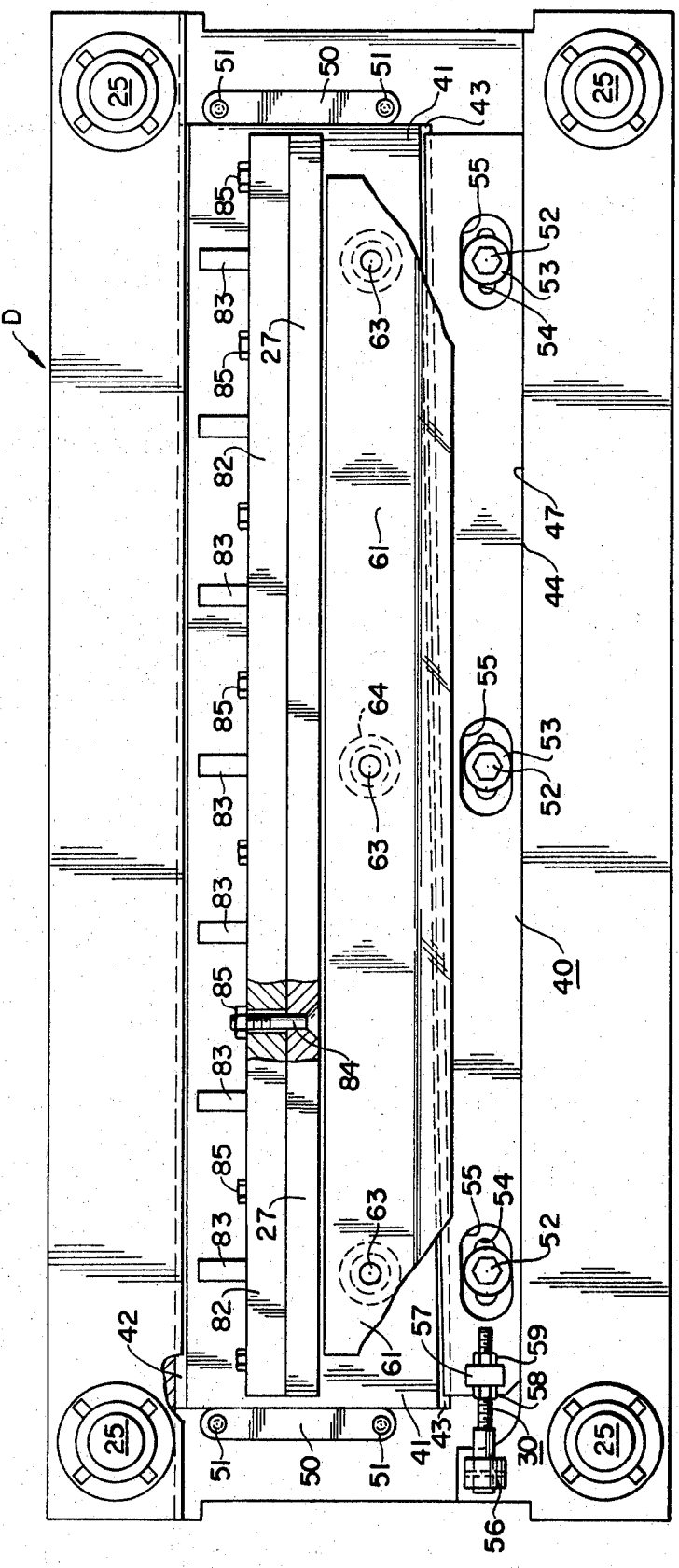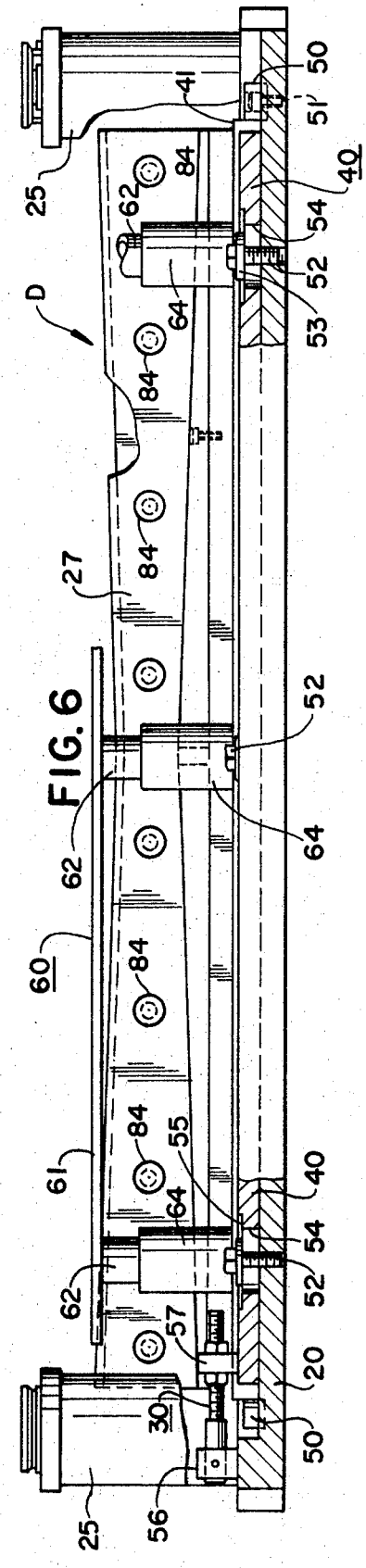
FIG. 5
FIG. 6

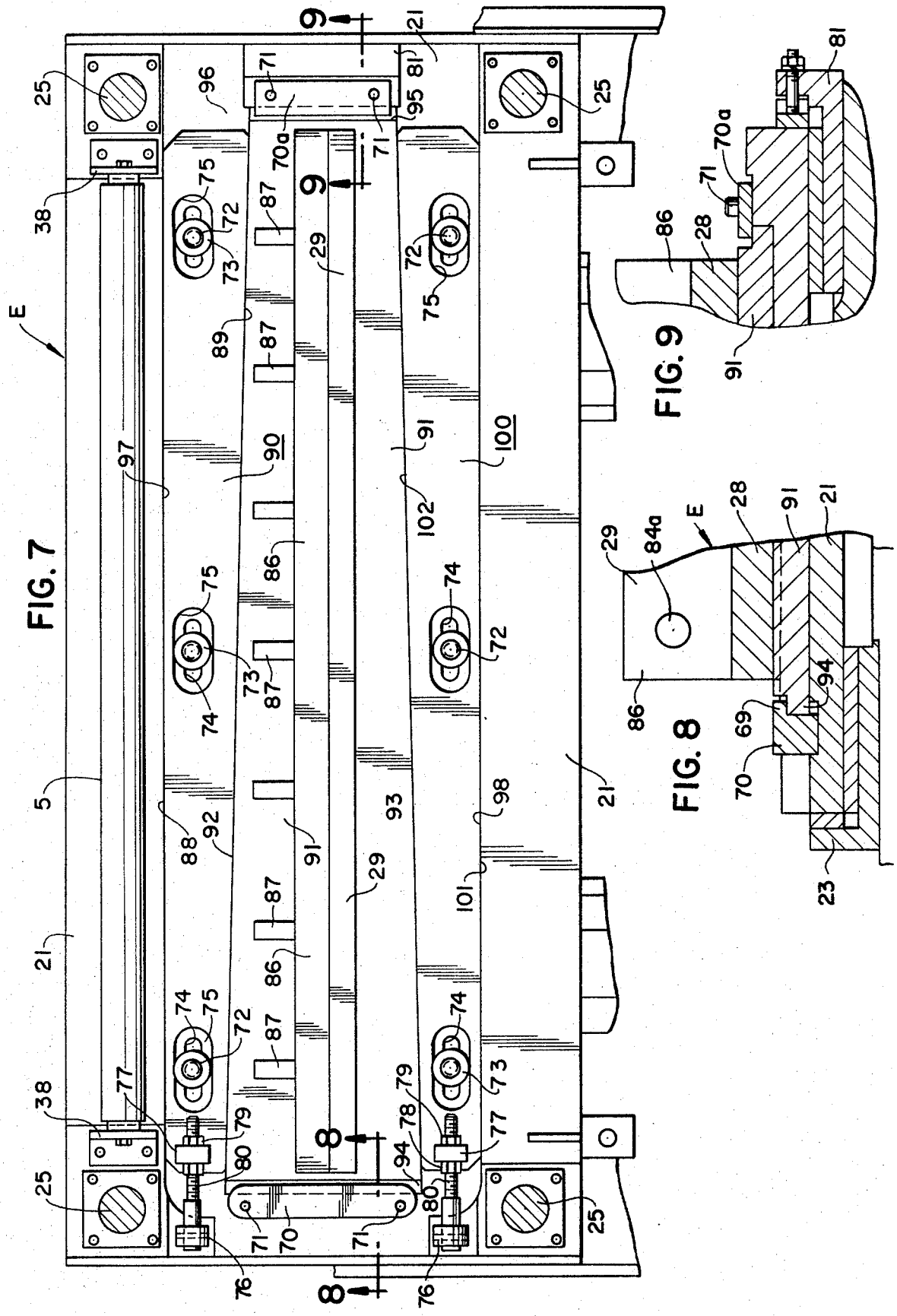

SHEAR APPARATUS WITH IMPROVED BLADE HOLDING MEANS

BACKGROUND OF THE INVENTION

The present invention relates to shear apparatus and more particularly to improved blade assemblies having the cutting blades secured to the shear apparatus in such a manner as to facilitate endwise removal and adjustment of the blades.

While the invention may be used to advantage on other types of shear apparatus, it provides particular advantages when used in flying shears for cutting a moving metal strip, which shears have cutting blades extending transversely of the direction of movement of the strip; and the invention will, therefore, be largely discussed below as so used.

Prior to the present invention, it was a difficult, time-consuming, and often dangerous task to replace or adjust the cutting blades in a conventional flying shear. In general, previous flying shears permitted removal or adjustment of blades only from the front or rear of the machine along the direction of movement of the strip. To do this, it often was necessary for an operator to work in confined or hazardous locations between the platens supporting the cutting blades of flying shear or between the flying shear and adjacent equipment at the front or rear of the flying shear, or to crawl over or dismantle adjacent equipment to provide desired access to the blades. For similar reasons, it was also difficult to position the blades accurately or to adjust the relationship between the blades, and shims were often required for these purposes. The above problems have long existed in flying shears but a fit solution was heretofore not provided.

SUMMARY OF THE INVENTION

The above problems are overcome in accordance with the present invention by providing, in a shear having cutting blades extending transversely of the movement of the material being cut, cooperating blade assemblies in at least one of which the blade is fixed to an elongated blade holding member extending transversely of the movement of the material being cut and having at least one of its elongated sides inclined at an angle to the longitudinal direction of the blade, the blade holding member being held in a supporting member on a platen of the shear by an elongated wedge-shaped member bearing against the inclined side of the blade holding member and against an abutment or shoulder on the supporting member. This construction permits removal and replacement or adjustment of the blade from the side of the machine, which preferably may be the operator's side of the machine.

Preferably, in a shear having upper and lower blade assemblies, the blade holding member of the upper blade assembly is firmly supported in a supporting member on the upper platen by overlapping engagement of the inclined side of the upper blade holding member and the wedge member and by overlapping engagement of the opposite side of the blade holding member and the supporting member, such overlapping engagement being preferably a dovetail engagement. A pair of removable key members are provided to hold the upper blade holding member in the upper supporting member against lengthwise movement.

The lower blade assembly preferably comprises a lower blade holding member having two opposite inclined sides so that the blade holding member in plan is substantially wedge-shaped, each of which inclined sides is clamped to a lower supporting member by two wedges each of which bears against the contiguous inclined side of the lower blade holding member and against an abutment or shoulder of the lower supporting member on the bottom platen. The inclined sides of the bottom member of the lower blade holding member have essentially the same taper but are of opposite hand so that when the tapered surfaces of both wedge members are forced against the opposite inclined sides of the lower blade holding member, the lower cutting blade may be moved toward or away from the upper cutting blade and be accurately aligned with it.

By advancing one wedge member of the lower assembly lengthwise by means of an adjusting screw and retracting the other wedge member a comparable distance by means of an adjusting screw, it is possible to make fine adjustments of the lower platen relative to the upper blade. After the proper adjustments have been made between the blades, hold-down screws on the lower wedge plates are tightened to hold the parts in place. Removable key members are preferably provided in the bottom blade assembly to hold the bottom blade holding member against lengthwise movement after adjustment.

The objects of the invention are to provide a single sturdy and relatively inexpensive means for mounting blades in a shear such as a flying shear, which facilitate removal, replacement, maintenance and adjustment of the cutting blades from a safe, convenient location at the side of the shear.

BRIEF DESCRIPTION OF THE DRAWINGS

These and other objects, uses and advantages of the present invention will become apparent to those skilled in the art from the following drawings, description and claims.

In the drawings:

FIG. 1 is a fragmentary side elevational view on a reduced scale showing apparatus for shearing a metal sheet including a flying shear constructed according to the present invention;

FIG. 5 is a plan from line 5—5 of FIg. 3 with parts broken away showing the upper blade assembly to a scale larger than that of FIG. 1;

FIG. 6 is a side elevation of the upper blade assembly on the same scale as FIG. 5 with parts broken away and parts shown in section;

FIG. 7 is a plan from line 7—7 of FIG. 3 showing the lower blade assembly to the same scale as FIG. 5;

FIG. 8 is a fragmentary vertical sectional view of a portion of the lower blade assembly taken at line 8—8 of FIG. 7 and to the same scale; and FIG. 9 is a fragmentary vertical sectional view taken from line 9—9 of FIG. 7.

DESCRIPTION OF THE INVENTION

Figure 1:
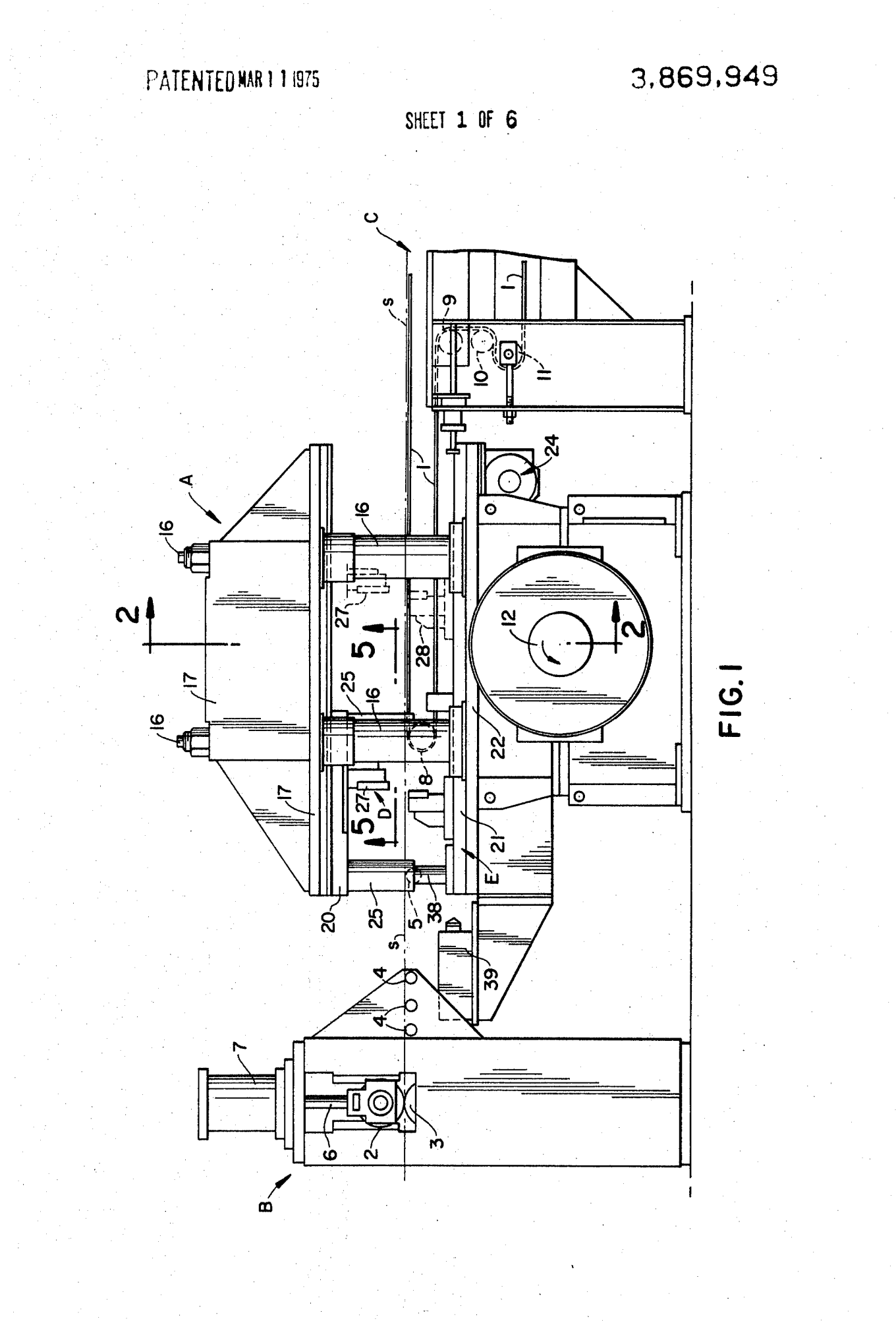
Figure 2:
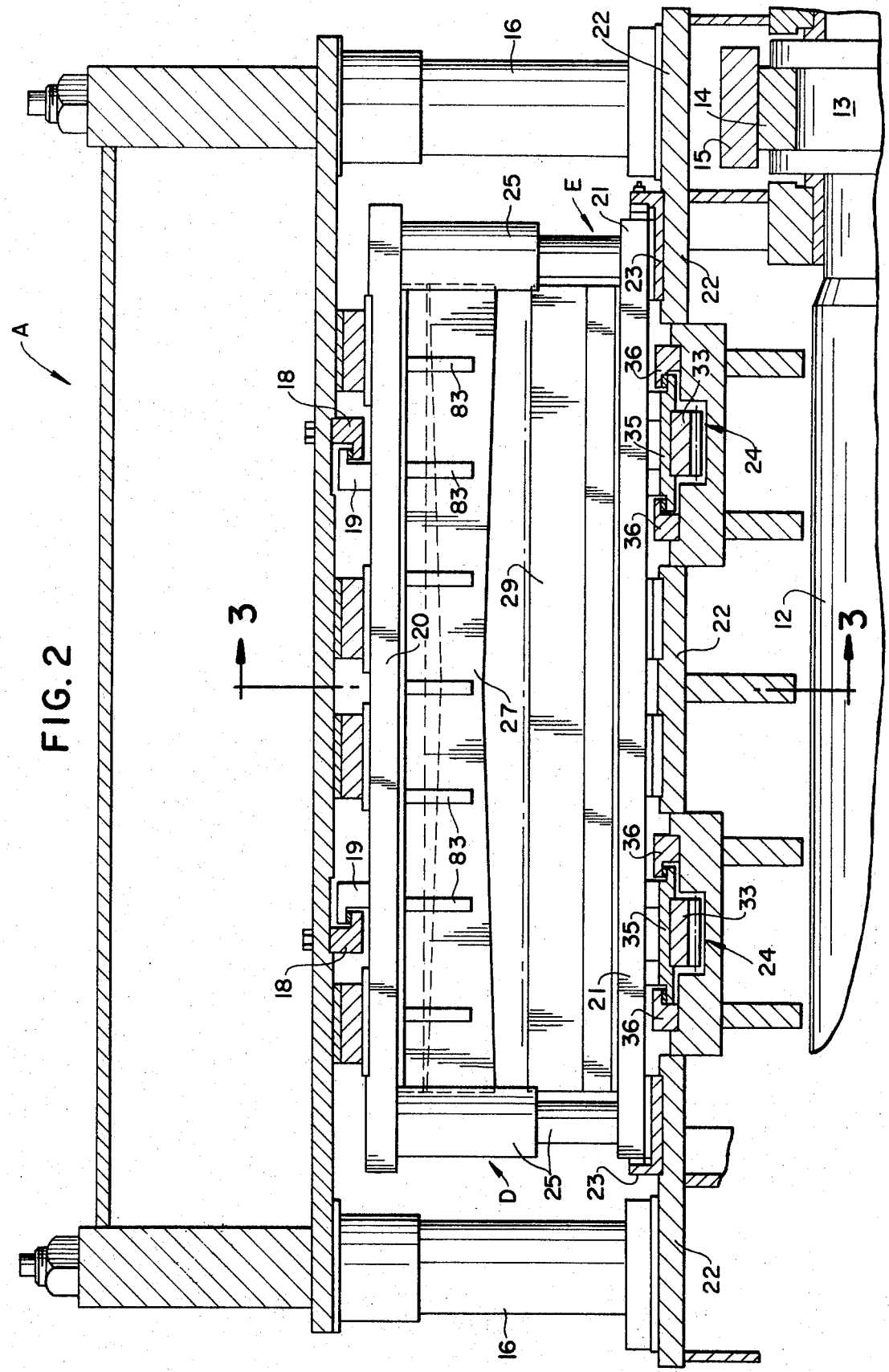
FIG. 2 is a fragmentary vertical sectional view of the shear of FIG. 1, along line 2—2 of FIG. 1, but to a larger scale with parts omitted.

Referring more particularly to the drawings, which are drawn substantially to scale and in which like parts are identified by the same numerals throughout the several views, FIGS. 1 and 2 show a flying shear A which is of conventional construction, except for the upper and lower blade assemblies D and E of this invention. The shear is located between a conventional pinch-roll assembly B and a conventional conveyor table C to cut a strip s of sheet metal or other sheet material as it moves toward the conveyor belt 1 of the table C. The strip s is gripped between the pinch rolls 2 and 3 and fed over the conveyor rolls 4 and 5 to the shear A. The piston rod 6 of the power cylinder 7 is connected to the upper pinch roll 2 to maintain pressure on the strip. The lower roll 3 may be motor driven if desired.

The endless conveyor belt 1 is wide enough to receive the cut sheets and is mounted to travel over a series of horizontal rolls 8 to 11. The conveyor is conventional and forms no part of this invention.

Figure 4:
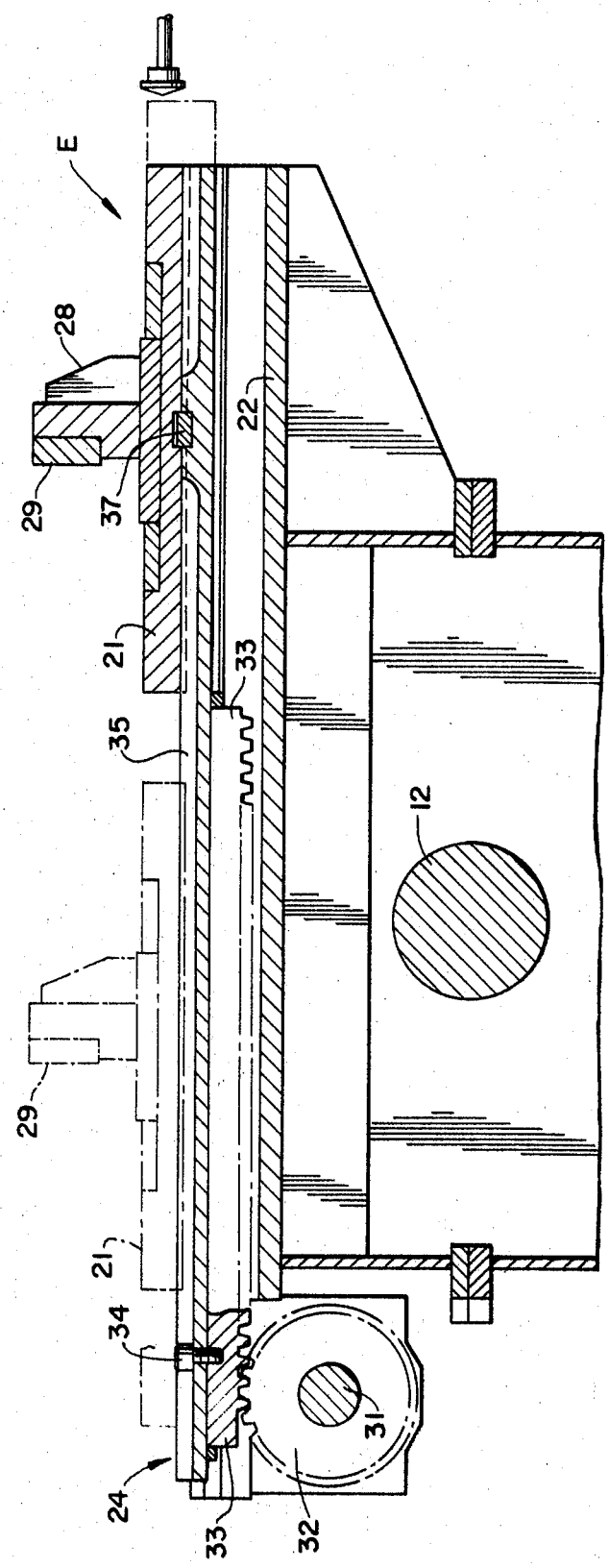
FIG. 4 is a fragmentary vertical sectional view to a scale approximating that of FIG. 2 with parts omitted and parts broken away showing the rack-and-pinion assembly and associated means for advancing the blade assemblies with the strip.

As heretofore known, the shear A has a crankshaft 12 (FIGS. 2 and 4) driven by suitable known means, not shown, with two offset crank portions 13, one of which is shown, located in the sliding blocks 14 of a pair of yokes 15. An upper platen 17 is rigidly attached to the tops of the four vertical posts 16 which move up and down with the yokes 15 and slidably carry the upper blade assembly D. As the crankshaft 12 makes one revolution, the upper blade assembly D moves down, cuts the strip in cooperation with the lower blade assembly E, and returns to the uppermost position.

A rectangular upper supporting member 20, rigidly carrying upper blade assembly D, is supported on the horizontal upper platen 17 to slide horizontally in the direction of movement of the strip s. As herein shown, the upper platen 17 has parallel horizontal slides 18 which engage the similar slides 19 of the member 20 to permit such horizontal sliding movement.

A rectangular lower supporting member 21, rigidly carrying lower blade assembly E, is mounted to slide on the parallel horizontal ways 23 of the lower platen 22 of the shear A. The upper and lower supporting members 20 and 21 are connected together by four known telescoping vertical posts 25 and slide horizontally in unison. The horizontal movement is effected by a rack-and-pinion assembly 24 shown in FIG. 4 including a drive shaft 31, a pair of pinion gears 32, and a pair of horizontal racks 33 having teeth meshing with the teeth of gears 32. Each rack 33 is rigidly connected by screws 34 to a horizontal support member 35 which is guided between parallel horizontal slides 36 of the lower platen. The lower supporting member 21 is mounted on the members 35 and keyed thereto by keys 37. An emergency stop may be provided at 39 for safety reasons.

The shear A is automatically controlled by conventional equipment in a conventional manner. In operation, the strip s, moving through a pinch roll at the entry end of the shear, causes electronic controls, not shown, to actuate a known drive, not shown, for the rack-and-pinion means 24 to cause the upper and lower blade assemblies D and E to move simultaneously back and forth parallel to the direction of travel of the strip in a horizontal path extending between the retracted position shown in solid lines in FIGS. 1 and 4 and the advanced position shown in dot-dash lines in those figures. When the units D and E are traveling in the same direction and at the same speed as the strip s, an automatic control, not shown, actuates a known clutch, not shown, to rotate crankshaft 12 from its drive means as required and thereby depress sliding blocks 14 and yokes 15. This lowers the upper platen and its upper blade assembly to effect cutting, as explained above.

During the time the cut is being made, the unit comprising the upper and lower blade assemblies D and E continues to move with the strip. At the end of the stroke, after the assemblies reach the end of their path of travel, the unit is returned to the entry side of the shear to await the signal to start another cycle. Such operation of the flying shear is conventional and forms no part of the present invention.

The present invention is concerned with the construction of the upper and lower blade assemblies D and E rather than the conventional parts of the shear A which are shown for purposes of clarification and to illustrate the environment and the advantages of the invention.

The upper blade assembly D (FIGS. 2, 3, 5, 6) comprises the slidable supporting member 20, an elongated top blade holder 26, the cutting blade 27, a tapered wedge 40, hold down means at 52, an adjusting screw means 30, key members 50, and other associated parts. The blade holder 26 comprises a flat horizontal mounting member 41 of uniform thickness with flat side surfaces 42 and 43 which allow the member 41 to be supported with its flat upwardly facing surface held against the flat horizontal downwardly facing surface 46 of the member 20. The surface 42 extends in a direction parallel to the side surfaces 49 of the rectangular member 20 and to the cutting edge of blade 27. The surface 43, on the other hand, extends in a direction which in plan is inclined slightly with respect to surfaces 49 to provide a taper. The resulting taper of the mounting member 41 may, for example, be one-quarter inch per foot of length of the mounting member.

Figure 3:
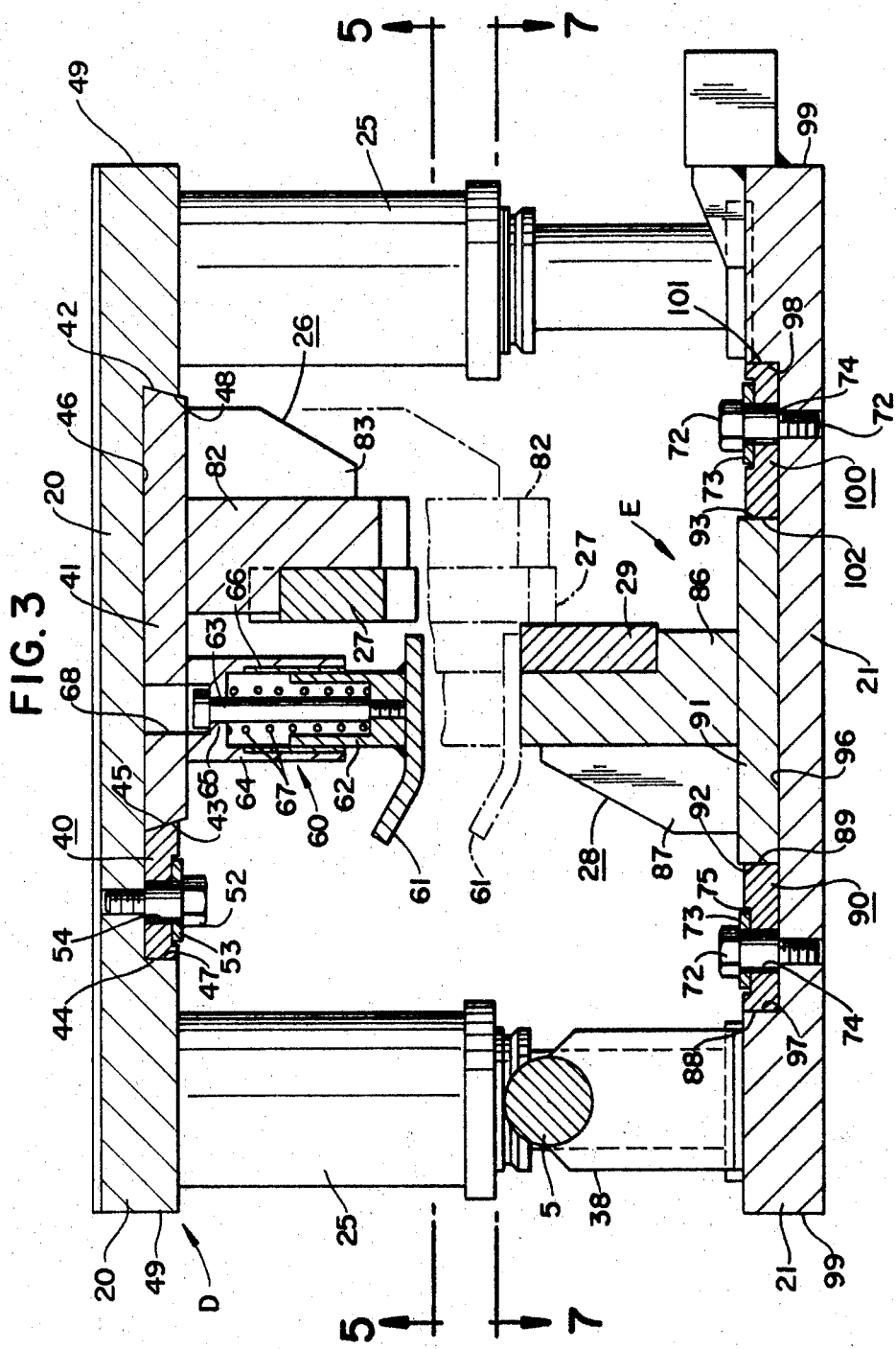
FIG. 3 is a vertical sectional view along line 3—3 of FIG. 2 to a still larger scale showing the upper and lower blade assemblies of the present invention, the lowermost position of the upper blade holder being shown in dot-dash lines.

The wedge 40 has the same taper and has a flat side surface 44 parallel to the surfaces 49 and a flat surface 45 which fits the surface 43 as shown in FIG. 3 and contacts the member 41 throughout the length thereof in overlapping engagement to prevent downward movement of the mounting member. The surface 45 has the same taper as the surface 43 so that the wedge 40 and the member 41 can fit together in the rectangular recess of the plate 20 with their flat upper surfaces engaging the flat surface 46 of said recess and their outer side surfaces 42 and 44 engaging the side surfaces 47 and 48 at the shoulders of the recess as shown in FIG. 3. The surface 48 contacts the surface 42 throughout the length of the plate 41 in overlapping engagement to prevent downward movement of the mounting plate.

The overlapping arrangement of the surfaces 42 and 48 at one side of the mounting plate 41 and the surfaces 43 and 45 at the opposite side of said plate, as shown in FIG. 3, enables the mounting plate to be rigidly carried by the support member 20 so it cannot fall out. While various overlapping arrangements can be used to provide the necessary support for plate 41, the dovetail arrangement shown in FIG. 3 is preferred.

Because the surfaces 47 and 48 of the shoulders extend in the same direction as the surfaces 49, the wedge 40 and member 41 can slide together in a lengthwise direction. A pair of removable key plates 50 are provided to prevent such longitudinal movement. Each key plate engages the flat end of the member 41 and is detachably connected to the plate 20 by screws 51 or other suitable holding means.

The wedge 40 is rigidly clamped in place by a series of hold-down bolts 52 which screw into the plate 20. Each bolt extends through an elongated slot 54 of the wedge 40 and has a washer 53 which fits in an elongated slot or recess 55 of the wedge. The slots 54 and recesses 55 allow the wedge to be moved lengthwise to tighten or loosen the grip on the mounting member 41. An adjusting screw 30 is provided to effect such movement of the wedge when the hold-down bolts are loosened. The adjusting screw is mounted on a hollow boss 56 rigidly carried by the plate 20 and extends through a hollow boss 57 that is rigidly mounted on the wedge 40. Nuts 58 and 59 are provided on the screw to hold it in its adjusted positions.

The upper blade assembly D has a pressure plate assembly 60 including a horizontal upwardly bent pressure plate 61 extending most of the length of the knife 27 and three regularly spaced hollow vertical cylinders 62 welded to the plate to support the same. A long vertical supporting bolt 63 is screwed into each cylinder 62. Three regularly spaced vertical cylindrical support members 64 are rigidly carried by the upper plate 41 to receive the cylinders 62, each member 64 having a cylindrical bearing sleeve 66 slidably receiving the smooth external cylindrical surface of the member 62 and having a portion 65 of reduced internal diameter slidably engaging the shank of the bolt 63 and supporting the head of the bolt. A helical spring 67 is mounted on the bolt and compressed between the portion 65 and the bottom portion of the cylinder 62. A bore 68 is provided in the plate 41 and each member 64 to receive the head of the bolt 63 and to permit removal of the bolt.

The upper blade holder 26 has a long blade support block 82 shaped to receive and fit the blade 27 and having a series of vertical reinforcing ribs 83. The lower blade holder 28 is similarly constructed and has a long blade support block 86 of similar size and shape with a series of vertical reinforcing ribs 87. A regularly spaced series of detachable clamping bolts 84 are provided along the length of the upper blade 27 to clamp the blade securely in place on the block 82, each bolt having a nut 85 engaging the outer surface of the block 82 as shown in FIG. 5. A series of similar detachable bolts 84a are provided along the length of the bottom blade 27 to clamp it securely in place on the block 86.

The lower blade assembly E comprises the slidable supporting member 21, an elongated lower blade holder 28, the cutting blade 29, two flat tapered wedges 90 and 100, hold-down means at 72, an adjusting screw means 80, key plates 70, and other associated parts. A pair of brackets 38 are mounted on the member 21 to support the horizontal roll 5. The blade holder 28 has a flat horizontal mounting member 91 of uniform thickness with flat vertical side faces 92 and 93 and a flat bottom surface which rests on the flat upper surface 96 of the plate 21. The faces 92 and 93 are perpendicular to surface 96 and are tapered equal amounts in opposite directions as shown in FIG. 7 so that the member 91 has the shape of a narrow trapezoid.

Reduced end portions 94 and 95 of uniform width are provided at the opposite ends of the member 91 to receive removable key plates 70 and 70a, each key plate being clamped in place on plate 21 by detachable screws 71 similar to the screws 51 of the upper plate 20. The key plate 70 has a flange 69 engaging the reduced portion 94 to clamp the member 91 in place on plate 21. A similar arrangement may be provided at the reduced portion 95. However, as herein shown the plate 21 has a raised stepped portion 81 at the end of the member 91 and a key plate 70a engaging the portion 94 to clamp it in place. The key plates 70 and 70a prevent longitudinal movement of the member 91 and can also serve to clamp it in place on plate 21.

The wedge 90 is similar to the wedge 40 and extends almost the full length of the member 91. It has flat straight vertical side faces 88 and 89 perpendicular to the surface 96. The face 89 has a small taper such as one-quarter inch per foot of length.

The wedge 100 is the same as the wedge 90 but of opposite hand. It has flat straight vertical side faces 101 and 102 perpendicular to the surface 96, the face 102 having the same taper as the surface 89 but in the opposite direction. As shown in FIG. 3, the mounting member 91 and the wedges 90 and 100 lie flat on the flat surface 96 of the rectangular recess in plate 21 and fill the recess, the surface 88 of the wedge 90 fitting against the flat side face 97 of the recess on one side and the surface 101 of wedge 100 fitting against the flat side face 98 of the recess on the other side. The vertical faces 97 and 98 at opposite shoulders of the recess are accurately machined so as to be parallel to the side faces 99 of the plate 21 and perpendicular to the surface 96. This provides accurate alignment of the bottom blade holder 28 with the top blade holder 26.

Each of the wedges 90 and 100 is moved by an adjusting screw 80 similar to screw 30 of wedge 40 and is clamped in place by a series of hold-down bolts 72 similar to hold-down bolts 52. Each bolt 72 extends through an elongated slot 74 of the wedge and has a washer 73 that fits an elongated recess 75 of the wedge. The slots 74 and recesses 75 allow longitudinal adjustment of the wedge by the screw 80 when the clamping bolts 72 are loosened.

Each of the wedges 90 and 100 has an adjusting screw 80 which functions essentially like the adjusting screw 30. Each screw 80 extends through a boss 76 rigidly mounted on the plate 21 and through a boss 77 rigidly mounted on the wedge. The screw is held in its adjusted position by nuts 78 and 79.

The unique blade assemblies D and E of the present invention make it very easy for an operator to change blades and properly adjust their positions. To change the upper cutting blade 27, the entire blade holder 26 is removed. This is accomplished by removing the key plate 50 on the operator side adjacent screw 30 and turning the nuts on the adjusting screw 30 to loosen the wedge 40 by forcing the wedge to move lengthwise away from boss 56. The entire blade holder 26 and blade 27 are now removed by sliding them endwise out the operator's side. Thereafter a new unit is slid into place, the key plate 50 is replaced, and the adjusting screw 30 is turned to pull the wedge toward boss 56 and to clamp the blade holder in place. The hold-down screws 52 are then tightened to clamp the new unit tightly in place.

To change the lower cutting blade, both wedges 90 and 100 are loosened by turning the nuts on their adjusting screws 80 to move the wedges away from the bosses 76 at the operator's side. The key plate 70 is then removed and the entire blade holder 28 and blade 29 are removed by sliding them endwise out of the machine at the operator's side.

Thereafter a new unit is slid into place from the operator's side, the key plate 70 is replaced, and the nuts on the adjusting screws 80 are turned to pull the wedges 90 and 100 towards the operator. The wide end of the member 91 and the narrow ends of the wedges 90 and 100 are located at the operator's side as shown in FIG. 7. The top blade 27 has a fixed position so that the bottom blade 29 must be adjusted to it. The adjustment is in the horizontal gap between the blades, and such adjustment must be made whenever blade 29 is replaced and must also be made at other times due to changes in the thickness of strip s and/or the wear of the blades.

All that is necessary to make the adjustment is to manipulate the nuts 78 and 79 on the adjusting screws 80 and to move one of the wedges 90 and 100 in one direction and the other in the opposite direction. Because the wedge faces 89 and 102 are accurately machined and provided with the same amount of taper (for example, one quarter inch per foot), the blade 29 remains parallel to the blade 27 while the horizontal gap is adjusted. When the proper gap is reached, the first wedge is pulled tight to lock the blade holder 28 in place, and the bolts 72 are tightened to maintain the wedges 90 and 100 in fixed positions.

The die assembly of the present invention is far superior to anything previously provided. It provides perfect alignment of the cutting blades, facilitates quick and positive replacement of the upper and/or lower blade assembly, provides quick, positive and fine adjustment of the horizontal gap between the cutting blades without the use of shims, eliminates the need for dismantling adjacent equipment to provide work room or access to the shear, and makes it much safer for the operator to effect replacemant and/or adjustment of the cutting blades. Because all replacement and adjustment operations can be performed from the operator's side, at the perimeter of the upper and lower platens, there is no need to crawl over adjacent equipment or to work in a hazardous area such as the space between platens.

It will be understood that, in accordance with the provisions of the patent laws, variations and modifications of the specific apparatus disclosed herein may be made without departing from the spirit of the invention.

Having described my invention, I claim:

1. In a machine of the character described, an upper platen having an upper supporting member mounted thereon, a lower platen having a lower supporting member mounted therein in vertical alignment with said upper supporting member, means for causing relative vertical movement of said platens toward and away from each other, a removable elongated top blade holder and top blade rigidly mounted on said upper supporting member, spaced shoulders in the upper portion of said lower supporting member having parallel side faces, a mounting member and a pair of elongated wedges mounted in the space between said shoulders for sliding movement lengthwise toward one side of the machine, a removable elongated lower blade holder and lower blade rigidly mounted on said mounting member, said wedges being mounted on opposite sides of said mounting member and having outer side surfaces slidably engaging said side faces of said shoulders and flat tapered inner side faces slidably engaging the side faces of said mounting member, said tapered side faces having the same amount of taper and being adapted to position said lower blade parallel to said top blade when the two wedges are forced against said mounting member and against the side faces of said shoulders, releasable hold-down means for clamping each wedge in its adjusted position, and releasable means for preventing sliding movement of said mounting member out of its adjusted position, said lower blade holder and lower blade being removable with said mounting member by sliding them lengthwise out of the side of the machine after said wedges are loosened.

2. The combination of claim 1 wherein adjusting screw means are provided on said lower supporting member for moving each of said wedges, said means being located at said one side of the machine.

3. The combination of claim 1 wherein said wedges are tapered in opposite directions and said mounting member is generally in the form of a trapezoid having tapered side faces which engage the tapered faces of the two wedges substantially throughout the length thereof when the mounting member is clamped in position.

4. The combination of claim 3 wherein the wider end of said mounting member is located at said one side of the machine to facilitate sliding out of said recess when the lower blade holder is removed.

5. The combination of claim 1 wherein shoulders are provided on said top supporting member, an elongated upper mounting member and an elongated upper wedge are mounted in the space between said shoulders for sliding movement lengthwise toward said one side of the machine, said top blade holder is rigidly mounted on said upper mounting member, said upper mounting member and said upper wedge when clamped in position in said space have tapered side faces which fit together along the length of the upper wedge and outer side faces which engage side faces of said shoulders, and releasable hold-down means are provided for clamping said upper mounting member and said upper wedge in position on said to supporting member.

6. The combination of claim 5 wherein one of said shoulders has a side face adapted to contact one side face of said upper mounting member in overlapping engagement to support the same, and the tapered side face of said upper wedge is adapted to contact the other side face of said upper mounting member in overlapping engagement to support the same.

7. The combination of claim 6 wherein screw means are provided on said top supporting member at said one side of the machine to adjust the position of said upper wedge, and releasable hold-down screws are provided in said upper wedge to attach it to said upper supporting member, said upper mounting member having its wider end located near said screw means to permit the upper mounting member to slide lengthwise out of said recess when said hold-down screws are loosened.

8. In a shear having upper and lower platens mounted to reciprocate vertically, means for feeding sheet material between said platens, upper and lower blade assemblies mounted between said platens to reciprocate horizontally in unison in the direction of feed of the sheet material, means mounting said blade assemblies for vertical reciprocation while maintaining the vertical alignment thereof, the improvement which comprises an upper horizontal supporting member on the upper blade assembly having a top blade holder and a top blade rigidly mounted on said upper supporting member, said blade holder having a tapered mounting member slidably mounted on said upper supporting member, an elongated upper wedge mounted on said upper supporting member to slide parallel to said mounting member to a position wherein it rigidly clamps the mounting member in position, a horizontal lower supporting member on the lower blade assembly having a pair of shoulders with parallel side faces, a tapered lower mounting member slidably mounted in the space between said shoulders, a lower blade holder and a lower blade rigidly mounted on said lower mounting member, a pair of lower wedges in said space on opposite sides of said lower mounting member, said lower wedges providing means for rigidly clamping said lower mounting member in adjusted positions wherein said lower blade is parallel to said upper blade, and means for adjusting the position of said lower wedges to adjust the horizontal gap between said blades.

9. A blade assembly for a shear comprising an elongated supporting member having spaced shoulders, a tapered removable mounting member mounted for longitudinal sliding movement into and out of the space between said shoulders, a blade holder and a cutting blade rigidly carried by said mounting member, said blade extending generally in the direction of sliding movement, means for clamping said mounting member in a fixed position in said space comprising an elongated wedge mounted in said space for longitudinal sliding movement, said wedge having an outer side surface slidably engaging one of said shoulders and having a tapered inner side face slidably engaging one side face of said mounting member, and means for rigidly connecting said wedge to said supporting member so that the wedge holds said mounting member in position between said shoulders.

10. The blade assembly of claim 9 in which said one side face of said mounting member overlaps the tapered side face of said wedge and the other side face of said mounting member overlaps a side face of said shoulder, whereby the overlapping surfaces provide supporting means for said mounting member to prevent it from moving away from said supporting member.

11. The blade assembly of claim 10 in which said overlapping surfaces are flat and inclined to provide a dovetail support for said mounting member.

12. The blade assembly of claim 9 in which a second elongated wedge is mounted in said space between said shoulders for longitudinal sliding movement, said second wedge having an outer side surface slidably engaging the other of said shoulders and having a tapered inner side face slidably engaging the other side face of said mounting member, and in which adjusting means are provided on said supporting member for changing the longitudinal position of each wedge, said shoulders being parallel and said wedges being tapered in the same direction so that the position of the cutting blades can be adjusted by moving the wedges in opposite directions.

13. In a blade assembly for a shear, a horizontal lower supporting member having a recess in the upper face thereof with a flat bottom surface and flat parallel side faces, a tapered mounting member and a pair of wedges mounted in said recess on said bottom surface for horizontal sliding parallel to said side faces, a blade holder and blade rigidly mounted on said mounting member, said wedges being mounted on opposite sides of said mounting member and having flat outer side surfaces slidably engaging said side faces of said recess and flat tapered inner side faces slidably engaging the side faces of said mounting member, the tapered side face of one wedge having the same amount of taper as the tapered side face of the other wedge and the same amount of taper as each side of the mounting member, the wide end of the mounting member being located adjacent the narrow ends of the wedges so that, when the wedges are tightened the mounting member and the blade are securely held in a predetermined angular position with respect to said recess and so that the mounting member can be accurately adjusted toward or away from the side faces of the recess by changing the clamped positions of the wedges without changing the angular position of said blade.

14. The combination of claim 13 wherein a horizontal upper supporting member is mounted above said lower supporting member for vertical reciprocation toward and away from the lower supporting member, an upper mounting member and an upper wedge are mounted on said upper supporting member for horizontal sliding movement generally parallel to the side faces of the recess in said lower supporting member, said upper mounting member has a tapered side face slidably engaging a tapered side face of said wedge and arranged to provide means for clamping said mounting member in position, means are provided for supporting said upper wedge and said upper mounting member from said upper supporting member, and a blade holder and upper blade are rigidly mounted on said upper mounting member, said upper blade being aligned with said first-named blade.

* * * * *